United States Patent [19]

Nakamura et al.

[11] Patent Number: 5,234,284

[45] Date of Patent: Aug. 10, 1993

[54] WHEELED ROAD SURFACE CUTTER

[75] Inventors: Mitsuo Nakamura, Niigata; Hitoshi Takahashi, Kashiwazaki; Eiki Nitta, Kashiwazaki; Akira Nakajima, Kashiwazaki, all of Japan

[73] Assignees: Kabushiki Kaisha Komatsu Seisakusho; Komatsu Est Corporation, both of Tokyo, Japan

[21] Appl. No.: 787,664

[22] Filed: Nov. 4, 1991

[51] Int. Cl.$^5$ .................. A43D 3/00; B62D 13/00; B60K 17/358
[52] U.S. Cl. ................................. 404/131; 180/235; 280/442.491.3
[58] Field of Search ................ 404/122, 131; 180/235, 180/217; 284/42; 280/442–444, 491.3–491.4; 299/39

[56] References Cited

U.S. PATENT DOCUMENTS

| | | | |
|---|---|---|---|
| 3,066,585 | 12/1962 | Cumpton | 404/122 X |
| 3,896,989 | 7/1975 | Ellis | 280/442 |
| 4,009,967 | 3/1977 | Layton | 219/214 |
| 4,212,147 | 7/1980 | Werner | 56/228 |
| 4,460,193 | 7/1984 | Dietz et al. | 56/228 |
| 4,754,815 | 7/1988 | Brouwer et al. | 180/235 |

Primary Examiner—Ramon S. Britts
Assistant Examiner—Nancy P. Connolly
Attorney, Agent, or Firm—Oblon, Spivak, McClelland, Maier & Neustadt

[57] ABSTRACT

Provided with a wheeled road surface cutter comprising a front section attached thereto with steerable front wheels on both sides thereof, a rear section attached thereto with rear wheels, a pivot joint for coupling the front end of the rear section to the rear end of the front section, and a cutting device attached to the rear section on one side and substantially aligned with one of the front wheels on the same side.

7 Claims, 5 Drawing Sheets

WHEELED ROAD SURFACE CUTTER

FIELD OF THE INVENTION

The present invention relates to a wheeled road surface cutter, and more particularly to a wheeled road surface cutter used as an auxiliary unit for a large-size road surface cutter.

BACKGROUND OF THE INVENTION

Conventional small-size road surface cutters have been used for cutting an asphalt or concrete road surface without using a heater. These small-size road surface cutters are adapted to be widely and variously used for repairing a road surface, not only as an auxiliary unit for a large-size road surface cutter but also as the one for locally cutting a road surface so as to repair a road surface for trail gouges, or the like. They are in general of a a four wheel steering type in order to attain turning of a small radius, having a cutting device arranged at one side, the front side or the rear side.

FIGS. 1A, 1B and 2 are views illustrating small-size wheeled road surface cutters of related art. FIG. 1A and 1B show a cutting device 12 which is set at one side of a vehicle body 11 while FIG. 2 shows a cutting device 14 which is set at the front end of a vehicle body 13.

However, the wheeled road surface cutters as shown in FIGS. 1A, 1B and FIG. 2, it is likely that the vehicle wheel is turned by an angular moment generated during cutting operation. Accordingly, there has been raised a problem that the weight of the vehicle wheel should be increased excessively or a cutting volume should be decreased.

SUMMARY OF THE INVENTION

The present invention is devised in order to solve the above-mentioned problems inherent in the related art, accordingly one object of the present invention is to provide a wheeled road surface cutter having a cutting device located at a suitable position.

According to the present invention, there is provided a wheeled road surface cutter comprising a front section having a longitudinal center line, a rear end and front wheels steerably attached thereto, a rear section having a longitudinal center line, a front end and rear wheels attached thereto, a pivot joint coupling the front end of the rear section to the rear end of the front section, and a cutting device mounted at one side of the rear section and positioned substantially direct rearward of one of the front wheels on the same side.

According to one aspect of the present invention, the pivot joint is positioned on the center line of the front section but is shifted toward the cutting device from the center line of the rear section.

According to a further aspect of the present invention, the cutter device is laterally aligned with the rear wheels.

According to a further aspect of the present invention, a fluid cylinder is provided for pivotal motion between the front and rear sections.

BRIEF DESCRIPTION OF THE DRAWINGS

A preferred embodiment of the invention will now be described with reference to the accompanying drawings in which:

FIGS. 1A and 1B are views illustrating a wheeled road surface cutter of related art, among which FIG. 1A is a side view thereof and FIG. 1B is a rear view;

FIGS. 5A and 5B are plan views showing relative positions of the components of wheeled road surface cutters, among which FIG. 5 shows the relative arrangement of the wheeled road surface cutter shown in FIG. 1A, and FIG. 5B shows the relative arrangement of the wheeled road surface cutter shown in FIG. 3; and, FIG. 6A and 6B are plan views illustrating working positions of the wheeled road surface cutter shown in FIG. 3 along a wall structure.

DESCRIPTION OF THE PREFERRED EMBODIMENTS

Figure 3:
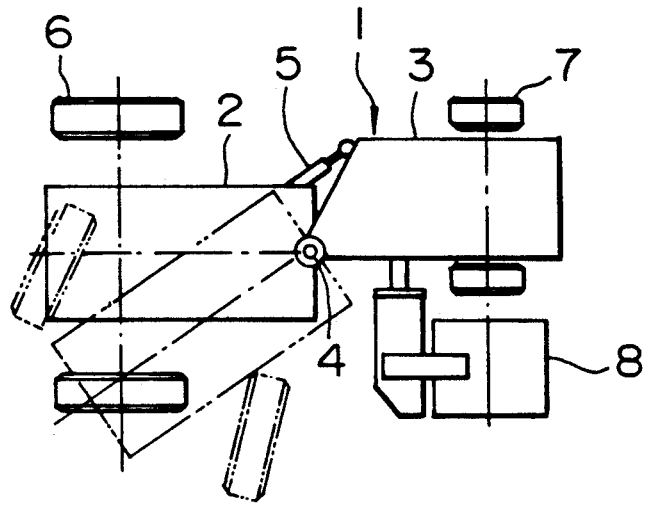
FIG. 3 is a plan view illustrating a wheeled road surface cutter in one embodiment form of the present invention.
Figure 4:
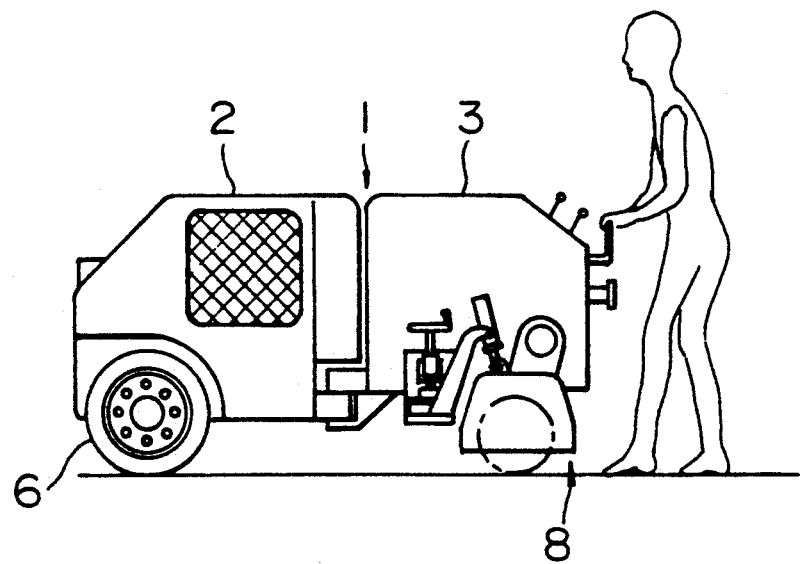
FIG. 4 is a side view of the wheeled road surface cutter shown in FIG. 3.

Referring to FIGS. 3 and 4, explanation will be made on one embodiment of the present invention.

In these figures, there are shown a vehicle body 1 which is divided, at a substantially middle position in the longitudinal length thereof, into a front section 2 and a rear section 3, a pivot joint 4 pivotably coupling the front end of the rear section 3 to the rear end of the front section 2, a hydraulic cylinder 5 connected between the front section 2 and the rear section 3 on one side of the vehicle body 1, for causing articulatory motion between the front section 2 and the rear section so as to adjust a relative angle there between, front wheels 6 steerably attached to the front section 2 on both sides thereof, rear wheels 7 which are non-steerably attached to the rear section 3 on both sides thereof, and a cutting device 8 mounted to the rear section 3 on the side remote from the side where the hydraulic cylinder 5 is mounted.

The pivot joint 4 is set substantially on the center line of the front section 2 but is shifted toward the cutting device 8 from the center line of the rear section 2.

The cutting device 8 is located on the outside of one of the rear wheels 7 on the side remote from the hydraulic cylinder 5 as shown in FIG. 3 and is connected mechanically in a power drive mechanism which is not shown and which is disposed in the rear section 3. Further, the cutting device 8 is located substantially direct rearward of one of the front wheels 6 on the side remote from the hydraulic cylinder 5.

That is, the cutting device 8 is longitudinally aligned with the front wheel 6, substantially, when the vehicle body takes its rectilinear advance posture.

Further, the other one of the front wheels 6 is longitudinally aligned with the other one of the rear wheels 7, substantially.

Next, explanation will be made of the operation of the wheeled road surface cutter in this embodiment.

When the vehicle body 1 is turned during normal rectilinear movement, the steeling operation is performed by using only the front wheels 6. If a small radius turn such as a minimum radius turn is required, the articulated motion caused by the hydraulic cylinder 5 is added to the above-mentioned steering operation, as shown in FIG. 3.

It is to be noted that the solid lines in FIG. 3 indicate the condition of the front section 2 and the front wheels 6, relative to the rear section 3, while the two-dot chain lines indicate a minimum radius turn condition of the front section 2 and the front wheels 6, relative to the rear section 3. The articulation of the vehicle body 1 can be made also in the direction opposite to the cutting device 8.

Figure 1A:
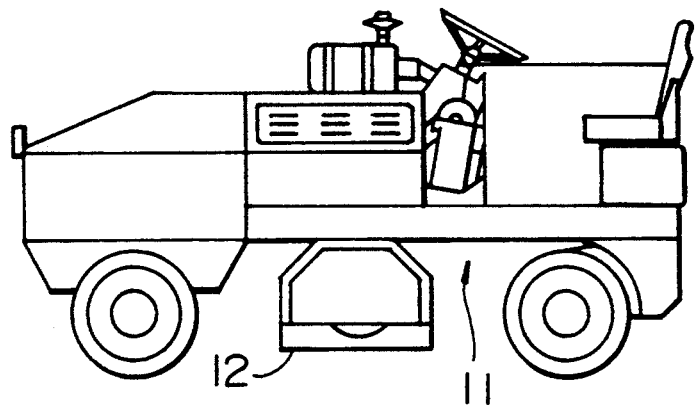
Figure 1B:
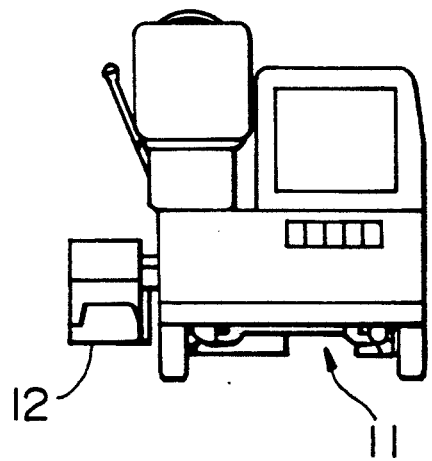
Figure 2:
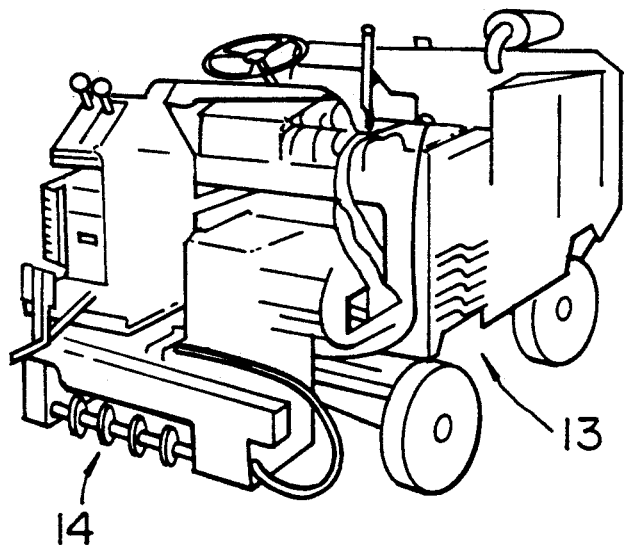
FIG. 2 is a perspective view illustrating another wheeled road surface cutter of related art.
Figure 5A:
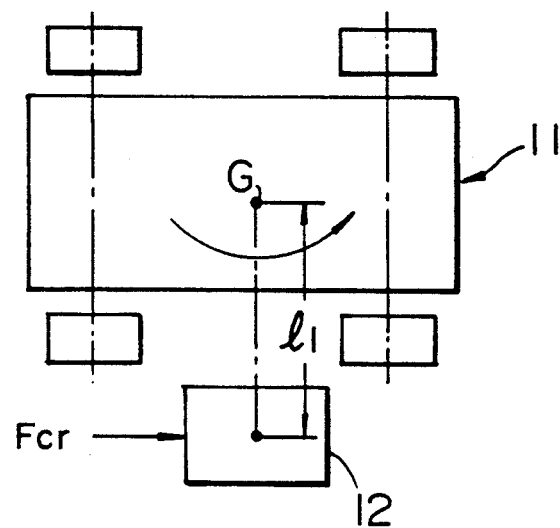
Figure 5B:
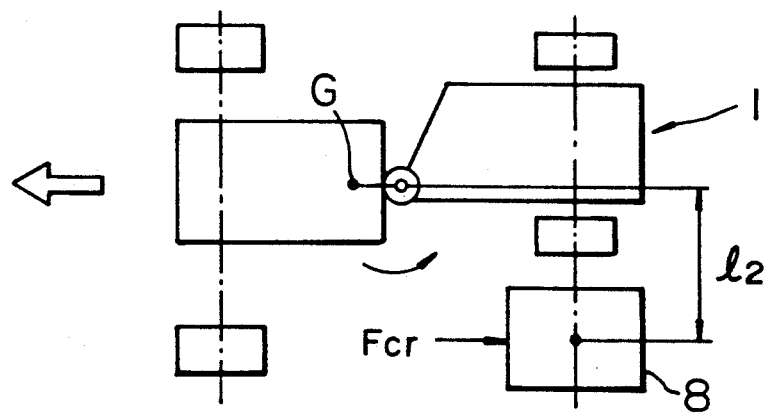

Referring to FIGS. 5A and 5B, explanation will be made of the comparison between the wheeled road surface cutter 1 according to the present invention and the one shown in FIGS. 1A and 1B.

The distance l, between the cutting device 12 and the center line which passes through the center of gravity of the vehicle body 11 shown in FIG. 5A is greater than the distance l, between the cutting device 8 and the center line which passes through the center of gravity of the front section 2 shown in FIG. 5B. Accordingly, the moment about the center of gravity that is caused by a force with which the the vehicle body is advanced and a reaction force given by the cutter is extremely small in the wheeled road surface cutter according to the present invention, as compared with that shown in FIG. 1A.

Accordingly, the wheeled road surface cutter according to the present invention can be substantially prevented from being turned by the cutting resistance of the cutting device.

Figure 6A:
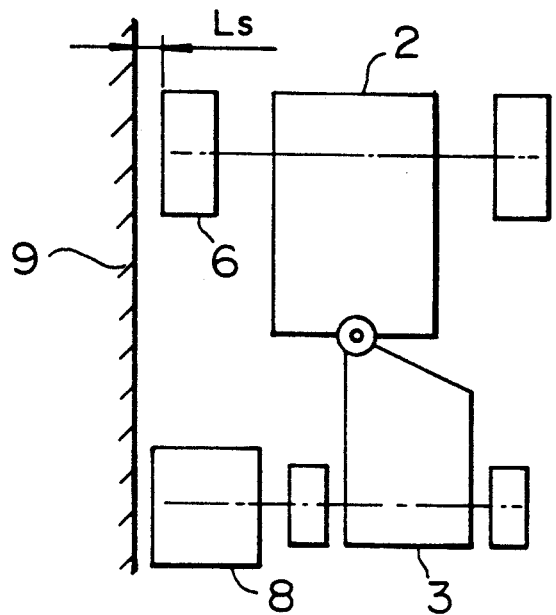
Figure 6B:
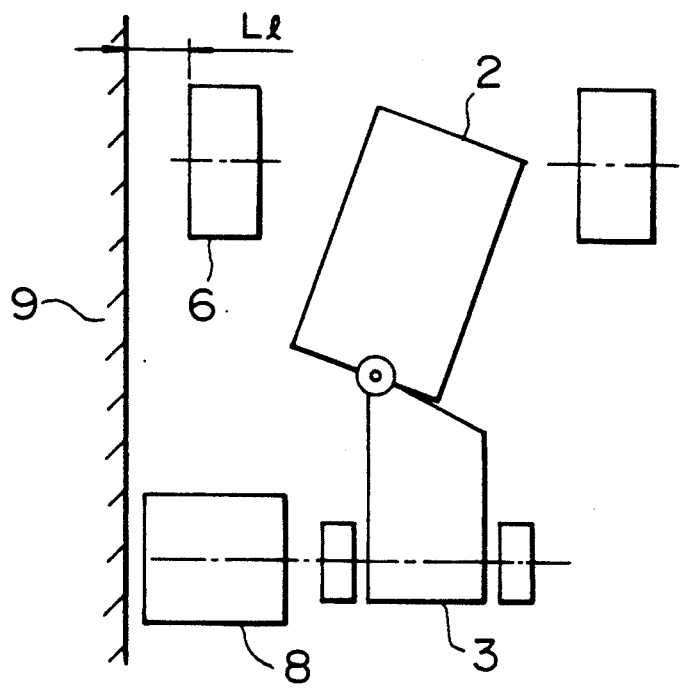

Further, in cutting a road surface in the vicinity of an obstruction 9 such as a shoulder of a road surface, a wall, a side channel groove or the like, the front section 2 is turned toward the side remote from the obstruction 9 as shown in FIG. 6B so as to obtain a clearance Ll between the front wheel 6 and the obstruction 9, which is larger than a a clearance Ls obtained in the condition of normal rectilinear movement as shown in FIG. 6A, thereby it is possible to prevent the front wheel 6 from bumping upon the obstruction 9. As mentioned above, with the arrangement of the present invention in which the vehicle body can be articulated substantially at the longitudinally middle position thereof, the radius of turn thereof can be decreased.

Further, since the cutting device is set on one side of the rear section of the vehicle body, directly rearward of one of the front wheels on the same side in the rectilinear movement posture, the turning force of the vehicle body, directly rearward of one of the front wheels on the same side in the rectilinear movement posture, the turning force of the vehicle body caused by the cutting reaction force can be reduced.

What we claim is:

1. A wheeled road surface cutter comprising:
   a front section attached thereto with steerable front wheels, and having a longitudinal center line and a rear end;
   a rear section attached thereto with rear wheels, and having a longitudinal center line and a front end;
   a pivot joint coupling the front end of said rear section to the said front section; and
   a cutting device attached to said rear section on one side thereof and outside of one of said rear wheels on the same side, substantially longitudinally aligned with one of said front wheels on the same side.

2. A wheeled road surface cutter as set forth in claim 1, wherein said pivot joint is located on the center line of said front section, but is shifted toward said cutting device from the center line of said rear section.

3. A wheeled road surface cutter as set forth in claim 1, wherein said cutting device is aligned laterally with said rear wheels.

4. A wheeled road surface cutter as set forth in claim 1, wherein one of said front wheels and one of said rear wheels on the side remote from the cutting device is longitudinally aligned with each other.

5. A wheeled road surface cutter as set forth in claim 1, wherein a fluid cylinder connects said rear section with said front section on the side remote from said cutting device.

6. A wheeled road surface cutter as set forth in claim 5, wherein said fluid cylinder is a hydraulic cylinder.

7. A wheeled road surface cutter as set forth in claim 1, wherein said rear wheels are nonsteerable.

* * * * *